(12) United States Patent
Yoshikawa (10) Patent No.: US 12,246,548 B2
(45) Date of Patent: Mar. 11, 2025

(54) RECORDING DEVICE AND RECORDING METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 167 days.

(21) Appl. No.: 18/145,876

(22) Filed: Dec. 23, 2022

(65) Prior Publication Data

US 2023/0202203 A1  Jun. 29, 2023

(30) Foreign Application Priority Data

Dec. 27, 2021  (JP) .................................. 2021-212427

(51) Int. Cl.

| | |
|---|---|
| *B41J 3/54* | (2006.01) |
| *B41J 3/01* | (2006.01) |
| *B41J 29/38* | (2006.01) |
| *G03G 15/00* | (2006.01) |
| *G03G 15/01* | (2006.01) |

(52) U.S. Cl.
CPC .................. *B41J 3/546* (2013.01); *B41J 3/01* (2013.01); *B41J 29/38* (2013.01); *G03G 15/0105* (2013.01); *G03G 15/5008* (2013.01); *G03G 15/5033* (2013.01); *G03G 2215/00033* (2013.01)

(58) Field of Classification Search
CPC ... B41J 3/546; B41J 3/01; B41J 29/38; G03G 15/0105; G03G 15/5008; G03G 15/5033
See application file for complete search history.

(56) References Cited

U.S. PATENT DOCUMENTS

2014/0232783 A1\* 8/2014 del Rio ................ B41J 11/0015
347/21

FOREIGN PATENT DOCUMENTS

JP          2010-278714 A    12/2010

\* cited by examiner

*Primary Examiner* — Jason S Uhlenhake
(74) *Attorney, Agent, or Firm* — Global IP Counselors, LLP (57) ABSTRACT

A recording device includes a recording unit configured to record a plurality of types of recording materials on a medium, and a control unit configured to control recording by the recording unit. When performing recording on the medium in accordance with recording data for recording a plurality of types of recording materials in a same region on the medium, the control unit identifies a first recording material with a relatively high recording density in the same region, and a second recording material with a lower recording density in the same region than that of the first recording material, based on recording data, and the control unit performs recording such that a second region in which recording is performed with the second recording material corresponding to the same region is smaller than a first region in which recording is performed with the first recording material corresponding to the same region.

6 Claims, 8 Drawing Sheets

| RECORDING AMOUNT [%] | | 0 | 10 | 20 | ... | 100 |
|---|---|---|---|---|---|---|
| RECORDING DENSITY | C | 0 | 1 | ... | ... | ... |
| | M | 0 | 2 | 6 | ... | 60 |
| | Y | 0 | 0.5 | ... | ... | ... |
| | K | 0 | 5 | 10 | ... | 100 |
| | Lc | 0 | 0.5 | ... | ... | ... |
| | Lm | 0 | 0.5 | ... | ... | ... |
| | Lk | 0 | 2 | ... | ... | ... |
| | ... | ... | ... | ... | ... | ... |

RECORDING DEVICE AND RECORDING METHOD

The present application is based on, and claims priority from JP Application Serial Number 2021-212427, filed Dec. 27, 2021, the disclosure of which is hereby incorporated by reference herein in its entirety.

BACKGROUND

1. Technical Field

The present invention relates to a recording device and a recording method for performing recording on a medium by using a plurality of types of recording materials.

2. Related Art

Counter measures have been proposed to prevent reduction in printing quality of letters and the like in a printed result obtained with an ink-jet printer due to blurring of the edge of the image with ink smudging.

As a counter measure, a technique for clearly expressing the edge portion by setting dots located on the outermost edge of the edge portion to a first dot size smaller than a second dot size of dots formed inside in the line width direction is disclosed (see JP-A-2010-278714).

Here, when an image is recorded on a medium with different recording materials such as inks of a plurality of colors in an overlapping manner, the positions of different recording materials that should be originally aligned on the medium may be shifted from each other due to the operation of the printer and errors of mounted components and the like. Such a positional displacement between recording materials impairs the appearance of the edge of the image recorded on the medium. Therefore, there is a need for improvements to avoid the reduction of the record quality due to the positional displacement between different recording materials.

SUMMARY

A recording device includes a recording unit configured to record a plurality of types of recording materials on a medium, and a control unit configured to control recording by the recording unit. When performing recording on the medium in accordance with recording data for recording a plurality of types of recording materials in a same region on the medium, the control unit identifies a first recording material with a relatively high recording density in the same region, and a second recording material with a lower recording density in the same region than that of the first recording material, based on recording data, and the control unit performs recording such that a second region in which recording is performed with the second recording material corresponding to the same region is smaller than a first region in which recording is performed with the first recording material corresponding to the same region.

A recording method of performing recording by controlling a recording unit configured to perform recording of a plurality of types of recording materials on a medium includes, when the recording unit performs recording on the medium in accordance with recording data for recording a plurality of types of recording materials in a same region on the medium, an identification step of identifying a first recording material with a relatively high recording density in the same region, and a second recording material with a lower recording density in the same region than that of the first recording material, based on recording data, and a recording step of performing recording such that a second region in which recording is performed with the second recording material corresponding to the same region is smaller than a first region in which recording is performed with the first recording material corresponding to the same region.

DESCRIPTION OF EXEMPLARY EMBODIMENTS

An embodiment of the present invention is described below with reference to the drawings. Note that each drawing is merely an exemplification for describing this embodiment. Since each drawing is an exemplification, the proportions, shapes, and shading may not be exact or consistent with each other, and may be partially omitted.

1. Overview of Device Configuration

Figure 1:
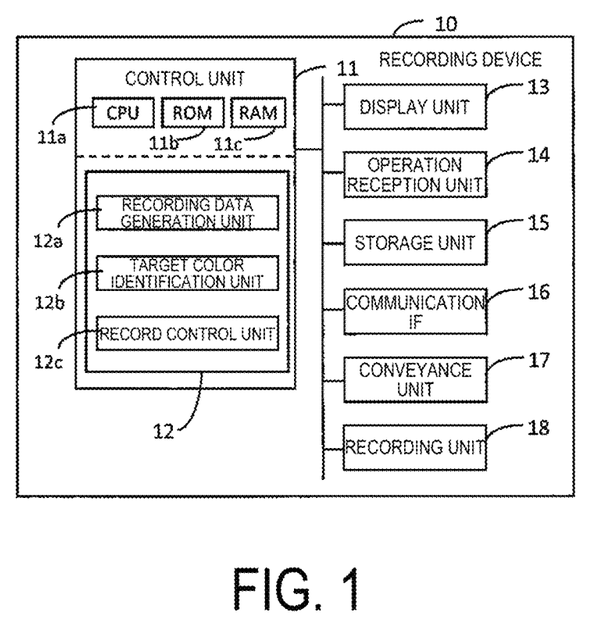
FIG. 1 is a block diagram schematically illustrating a device configuration of this embodiment.

FIG. 1 schematically illustrates a configuration of a recording device 10 according to this embodiment. The recording device 10 performs a recording method of this embodiment.

The recording device 10 includes a control unit 11, a display unit 13, an operation reception unit 14, a storage unit 15, a communication IF 16, a conveyance unit 17, a recording unit 18 and the like. IF is an abbreviation of interface. The control unit 11 has a configuration including one or a plurality of ICs including a CPU 11a serving as a processor, a ROM 11b, a RAM 11c and the like, other nonvolatile memories and the like.

In the control unit 11, the processor, i.e., the CPU 11a performs an arithmetic process in accordance with a program 12 stored in the ROM 11b, another memory or the like, with the RAM 11c and the like used as the work area, and thus various functions such as a recording data generation unit 12a, a target color identification unit 12b and a record control unit 12c are implemented. The processor is not limited one CPU, and may have a configuration that performs a process with a plurality of CPUs or a hardware circuit such as ASIC or a configuration that performs a process with the CPU and the hardware circuit in conjunction with each other.

The display unit 13 is a means for displaying visual information, and is composed of a liquid crystal display, an organic EL display or the like, for example. The display unit 13 may have a configuration including a display and a driving circuit for driving the display. The operation reception unit 14 is a means for receiving input from the user, and is implemented with a physical button, a touch panel, a mouse, a keyboard and the like, for example. Naturally, the touch panel may be implemented as a function of the display unit 13. A configuration including the display unit 13 and the operation reception unit 14 may be referred to as the operation panel of the recording device 10. The display unit 13 and the operation reception unit 14 may be a part of the configuration of the recording device 10, or may be a peripheral device externally attached to the recording device 10.

The storage unit 15 is a storage means composed of a hard disk drive, a solid-state drive, or other memories, for example. A part of the memory provided in the control unit 11 may be regarded as the storage unit 15. The storage unit 15 may be regarded as a part of the control unit 11.

The communication IF 16 is a collective term of one or a plurality of IFs for the recording device 10 to perform communication with an external device in a wired or wireless manner in compliance with a predetermined communication protocol including publicly known communication standards. The external device is a communication device such as a personal computer, a server, a smartphone and a tablet terminal, for example.

The conveyance unit 17 is a means for conveying a medium 30 along a predetermined conveyance direction under the control of the control unit 11. The conveyance unit 17 includes a roller that rotates to convey the medium 30, a motor serving as a power source for the rotation and the like, for example. In addition, the conveyance unit 17 may be a mechanism that conveys the medium 30 placed on a motorized belt or pallet. The medium 30 is, for example, a sheet, but may be a material other than paper such as a film and fabric as long as the medium 30 can serve as a recording object.

The recording unit 18 is means for performing recording on the medium 30 by using a plurality of types of recording materials under the control of the control unit 11. The plurality of types of recording materials include color materials of a plurality of colors. The color material is ink used for ink-jet recording, or toner used for electrophotographic recording. Various recording methods such as ink-jet methods and electrophotographic methods may be employed for the recording unit 18. In the following description, the recording unit 18 is a means that performs recording by discharging inks of a plurality of colors by an ink-jet method. The recording unit 18 may discharge not only ink but also liquid that does not correspond to ink.

The recording device 10 may be composed of one printer, but may be implemented with a system including a plurality of communicatively connected devices. For example, the recording device 10 may be a system including an information processing device serving as the control unit 11, and a printer that includes the conveyance unit 17 and the recording unit 18 and performs recording under the control of the information processing device. In this case, the information processing device may be regarded as a record control device, an image processing device and/or the like.

Figure 2:
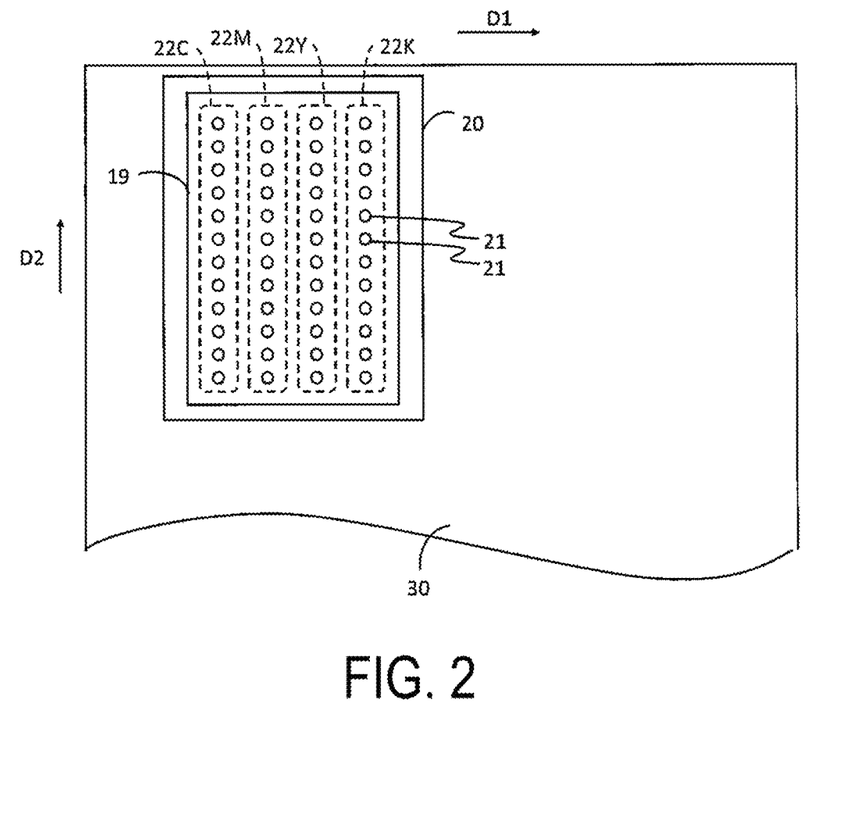
FIG. 2 is a diagram schematically including a relationship between a medium and a recording head and the like as viewed from above.

A specific example of the recording unit 18 is described below with reference to FIG. 2. FIG. 2 schematically illustrates relationships between the medium 30, a recording head 19 and the like as viewed from above. In FIG. 2, the recording head 19 is mounted in a carriage 20. That is, in the example illustrated in FIG. 2, the recording unit 18 includes the recording head 19 and the carriage 20. The carriage 20 can move back and forth along a predetermined main scanning direction D1 with the power of a carriage motor not illustrated in the drawing under the control of the control unit 11. Thus, the recording head 19 moves forward and backward along the main scanning direction D1 together with the carriage 20.

The recording head 19 includes a plurality of nozzles 21 for discharging liquid such as ink. In FIG. 2, white circles represent respective nozzles 21. A droplet discharged from the nozzle 21 is referred to as dot. The recording head 19 includes nozzle rows for respective liquid types. The recording head 19 can discharge inks of a plurality of colors, e.g., cyan (C), magenta (M), yellow (Y), black (K), light cyan (Lc), light magenta (Lm) and light black (Lk). The recording head 19 may be referred to as liquid discharging head, printing head, print head, ink-jet head and the like.

FIG. 2 very simply illustrates four nozzle rows 22C, 22M, 22Y and 22K. A nozzle row corresponding to ink of one color is composed of the plurality of nozzles 21 with a constant or substantially constant nozzle pitch, which is the distance between the nozzles 21 in a direction D2 that intersects the main scanning direction D1. For example, the nozzle row 22C is a nozzle row composed of the plurality of nozzles 21 that discharge C ink. Likewise, the nozzle row 22M is a nozzle row composed of the plurality of nozzles 21 that discharge M ink, the nozzle row 22Y is a nozzle row composed of the plurality of nozzles 21 that discharge Y ink, and the nozzle row 22K is a nozzle row composed of the plurality of nozzles 21 that discharge K ink. Although not illustrated in the drawings, naturally, the recording head 19 may also include nozzle rows corresponding to respective colors such as Lc ink, Lm ink, and Lk ink other than CMYK inks.

The direction D2 represents the conveyance direction D2 of the medium 30 by the conveyance unit 17. The conveyance unit 17 conveys the medium 30 upstream to downstream in the conveyance direction D2. The upstream and downstream sides of the conveyance direction D2 are simply referred to as upstream and downstream. The main scanning direction D1 and the conveyance direction D2 are orthogonal or substantially orthogonal to each other. The plurality of nozzle rows such as the nozzle rows 22C, 22M, 22Y and 22K provided in the recording head 19 are disposed side by side along the main scanning direction D1 at the same position in the conveyance direction D2.

The control unit 11 causes the recording head 19 to discharge ink to the medium 30 on the basis of recording data representing an image. As is known, in the recording head 19, each nozzle 21 is provided with a driving element. Through the control of application of the driving signal to the driving element of each nozzle 21 in accordance with recording data, the dot is discharged or not discharged from each nozzle 21 and the image represented by the recording data is recorded on the medium 30.

Ink discharging with the recording head 19 along with the movement of the carriage 20 is referred to as path or scanning. The path of the forward movement of the carriage 20 is referred to as forward path, and the path of the backward movement of the carriage 20 is referred to as backward path. The recording performed through both the forward path and the backward path is bidirectional recording, and the recording performed through one of the forward path or the backward path is the single direction recording. In this embodiment, any of the bidirectional recording and the single direction recording may be employed. The control unit 11 records the image represented by the recording data on the medium 30 through a combination of the path with the carriage 20 and the recording head 19, and the conveyance the medium 30 by a predetermined distance with the conveyance unit 17.

The configuration illustrated in FIG. 2 is merely an example. For example, the carriage 20 may move back and forth not only along the main scanning direction D1, but also along the conveyance direction D2. Specifically, the recording head 19 may two-dimensionally move in parallel to the surface of the medium 30 with the carriage 20 so as to perform recording in a predetermined area in the medium 30 in a stopped state, and the control unit 11 may repeat such recording and conveyance of the medium 30.

Alternatively, the carriage 20 may be omitted and the recording head 19 may not move. In this case, the recording head 19 is a line head including a nozzle row for each color of ink with a length that covers the length of the medium 30 in the main scanning direction D1. The recording head 19 of the line-type is fixed on the conveyance path of the medium 30, and the control unit 11 performs recording by discharging ink from the recording head 19 to the medium 30 being conveyed.

2. Record Control Process

Figure 3:
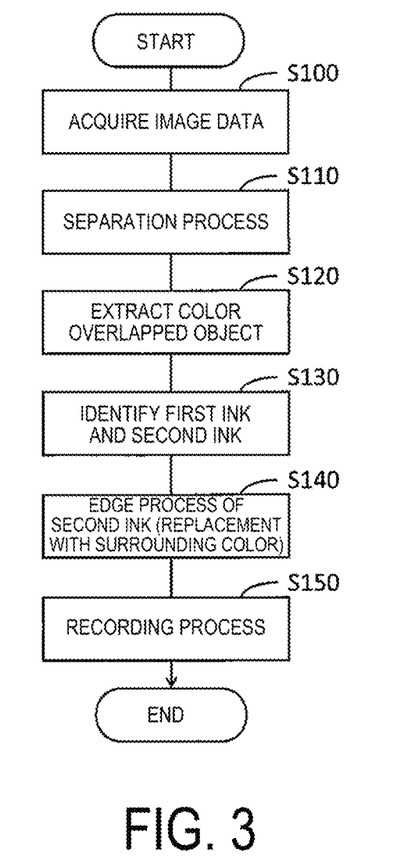
FIG. 3 is a flowchart of a record control process.

FIG. 3 is a flowchart illustrating a record control process performed by the control unit 11 in accordance with the program 12. The flowchart illustrates a recording method according to this embodiment.

At step S100, the recording data generation unit 12a of the control unit 11 acquires image data representing an image to be recorded. From the storage space of the image data such as the storage unit 15, and a memory inside or outside of the recording device 10, the recording data generation unit 12a acquires image data designated by the user through an operation at the operation reception unit 14, for example. Alternatively, the recording data generation unit 12a acquires image data sent from an external device by receiving it through the communication IF 16.

At step S110, the recording data generation unit 12a performs a separation process on the image data acquired at step S100 and converts it to recording data. Note that the image data acquired at step S100 can be regarded as recording data before the separation process. Here, the separation process is described with an example case where the recording head 19 performs recording by using ink of six colors, C, M, Y, K, Lc and Lm. In the separation process, the recording data generation unit 12a converts the value of each pixel making up the image data into a gradation value representing the recording amount of each CMYKLcLm. The recording amount may be referred to as ink amount. The color system employed by the image data acquired at step S100 is not limited, and the image data is RGB image data having gradation values of red (R), green (G) and blue (B) for each pixel, and/or CMYK image data having gradation values of CMYK for each pixel, for example.

For example, in the case where the image data is RGB image data, the recording data generation unit 12a converts each gradation value of RGB of each pixel of image data into each gradation value of CMYKLcLm with reference to a color conversion look-up table (hereinafter referred to as color conversion LUT) in which the conversion relationship from RGB to CMYKLcLm is preliminarily defined. Color conversion LUT is stored in the storage unit 15, for example. The gradation value is expressed in 256 levels of 0 to 255, for example. The recording data obtained through the above-described separation process is image data including the gradation value of each CMYKLcLm for each pixel, and can be regarded to be composed of parts of CMYKLcLm.

At step S120, the target color identification unit 12b analyzes the recording data after the separation process at step S110, and extracts an object recorded with a plurality of types of recording materials in an overlapping manner. The object is elements of various images represented by the recording data in a page, and is, for example, a letter, a ruled line, a diagram, a nature painting, a portrait, an illustration, or a part of them. The state recorded with a plurality of types of recording materials in an overlapping manner means that inks of a plurality of colors as color materials of a plurality of colors are recorded in an overlapping manner in the same region of the medium 30. In the following description, the object recorded with a plurality of types of recording materials in an overlapping manner is referred to as "color overlapped object".

Figure 4A:
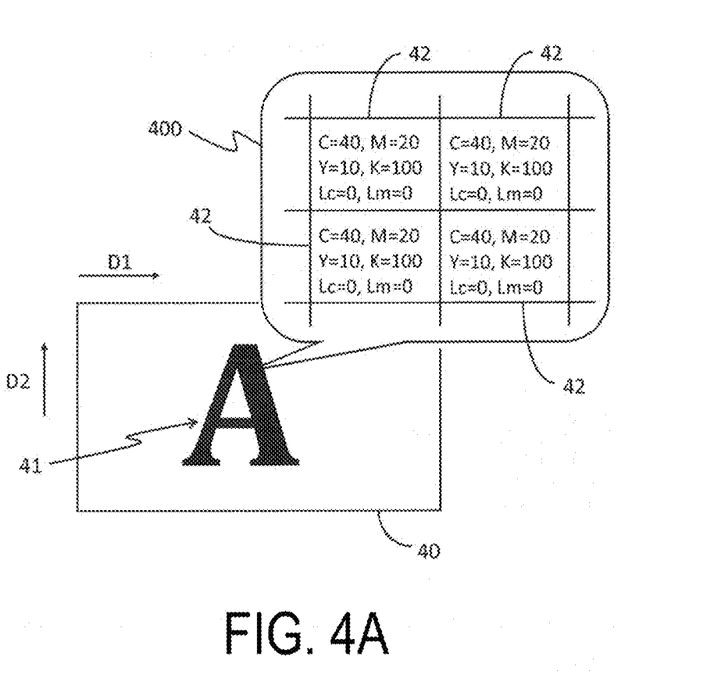
FIG. 4A is a diagram for describing an example of a color overlapped object.

FIG. 4A is a diagram for describing an example of a color overlapped object. FIG. 4A illustrates a part of recording data 40 and a letter 41 "A" included in the recording data 40. Further, in an enlarged view 400, FIG. 4A illustrates each pixel 42 making up the letter 41 and the gradation value of each CMYKLcLm of each pixel 42 an enlarged manner. It should be noted that each value of CMYKLcLm in the enlarged view 400 is a value of 0 to 255 gradation range normalized on a scale of 0 to 100[%]. 0% corresponds to a gradation value=0, and 100% corresponds to a gradation value=255. Further, FIG. 4A illustrates a relationship between the direction of the recording data 40 and directions D1 and D2.

The letter 41 is represented by black of R=G=B=0 in the image data acquired at step S100, for example. The black of the letter 41 has been converted to a recording amount of C=40%, M=20%, Y=10%, K=100%, Lc=0% and Lm=0% as a result of the separation process at step S110. While black can be expressed with K=100% alone, it is possible to express a deep black that is so-called "rich black" by mixing in some chromatic colors such as C, M and Y. The above-described letter 41 is an object recorded with parts of four colors of CMYK in an overlapping manner on the medium 30, and as such corresponds to an example of the color overlapped object.

The target color identification unit 12b extracts the above-described color overlapped object to be recorded with ink of two or more colors in an overlapping manner in the recording data. Even when an object not corresponding to the color overlapped object is included, recording data including at least one color overlapped object corresponds to "recording data for recording a plurality of types of recording materials in the same region of the medium 30" according to this embodiment. The object not corresponding to the color overlapped object is an object recorded with only ink of one color, or an object where regions of inks of a plurality of colors are originally shifted from each other and overlap each other, for example. In the following description, it is assumed that one or more color overlapped objects are successfully extracted from the recording data at step S120.

Figure 4B:
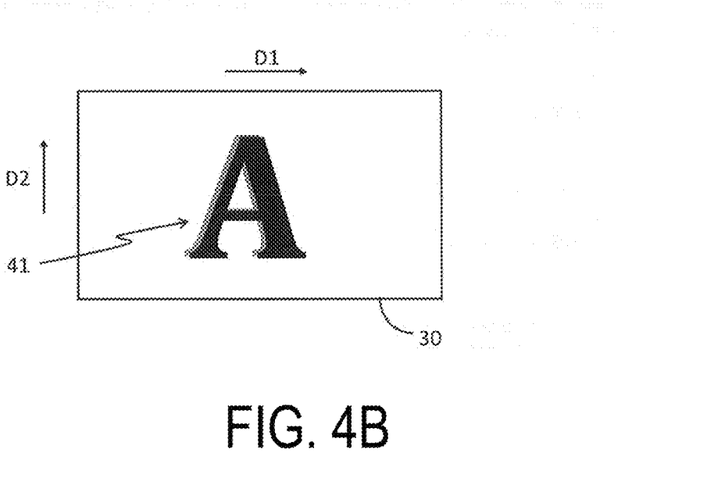
FIG. 4B is a diagram for describing a problem to be solved.

FIG. 4B is a diagram for describing a problem to be solved assumed in this embodiment, and illustrates an example of the letter 41 recorded on the medium 30. More specifically, FIG. 4B illustrates the letter 41 reproduced on the medium 30 in a case where normal recording is performed with the recording unit 18 on the basis of the recording data 40 illustrated in FIG. 4A without performing steps S120 to S140. The parts of four colors of CMYK representing the letter 41 in the recording data 40 should be recorded with respective color inks on the medium 30 without being shifted from each other. However, the formation positions of the color inks on the medium 30 may be shifted from each other due to slight deviations in the operations of the carriage 20 and/or the recording head 19, conveyance errors of the conveyance unit 17, manufacturing errors of the components making up the recording unit 18 and the like, for example. As a result, as illustrated in FIG. 4B, slight protrusion of a color other than black may be visually recognized at the edge of the letter 41 that should be black, thus blurring the edge. This embodiment improves such poor appearance at the edge.

Description returns to FIG. 3.

At step S130, regarding the color overlapped object extracted at step S120, the target color identification unit 12b identifies "first recording material" with a relatively high recording density of the region (same region) on the medium 30 where the color overlapped object is recorded, and "second recording material" with a lower recording density of that region than that of the first recording material on the basis of the recording data. Step S130 corresponds to "identification step". In the following description, the first recording material is also referred to as "first ink", and the second recording material is also referred to as "second ink". The second ink has a color to be subjected to the edge process at step S140. As such, the second ink may be referred to as "target color".

The recording density is an optical density or a value corresponding to optical density. The higher the value, the darker, and the lower the value, the brighter. The target color identification unit 12b acquires the recording density of each ink in accordance with the recording amount of each ink for recording the color overlapped object. Basically, the ink with the highest recording density is the first ink, and the ink other than the first ink is the second ink. Alternatively, the target color identification unit 12b may calculate the brightness of each ink in accordance with the recording amount of each ink for recording the color overlapped object, and identify the first ink and the second ink under the rule where the higher the brightness, the lower the recording density, and the lower the brightness, the higher the recording density.

Figure 5A:
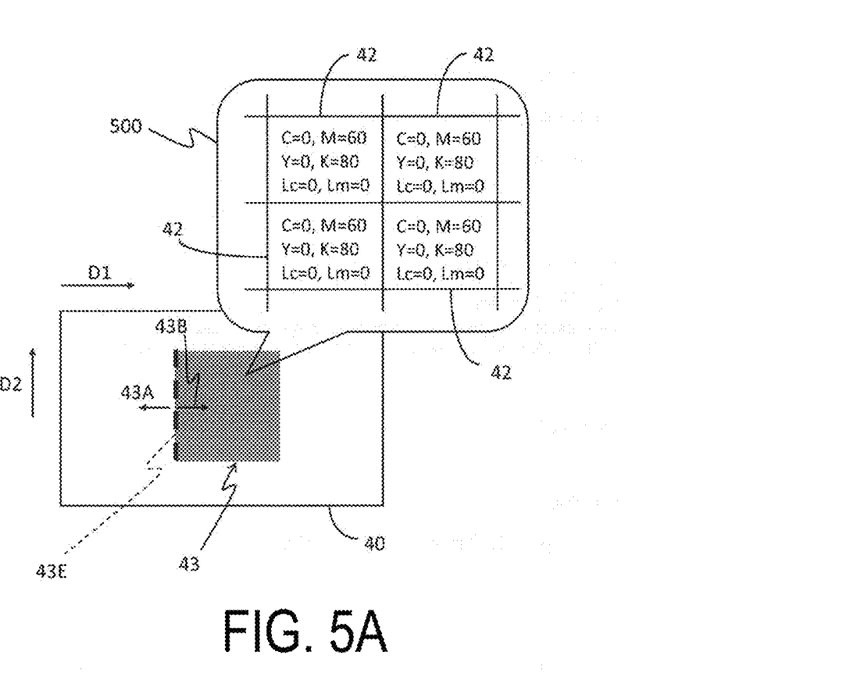
FIG. 5A is a diagram for describing a specific example of step S130.

FIG. 5A is a diagram for describing a specific example of step S130, and illustrates a part of the recording data 40 and a diagram 43 included in the recording data 40. The diagram 43 is an example of the color overlapped object, and has a simple rectangular shape in FIG. 5A. The illustration manner of FIG. 5A is the same as that of FIG. 4A, and illustrates each pixel 42 making up the diagram 43 and the recording amount of each CMYKLcLm of each pixel 42 in an enlarged manner in an enlarged view 500. As a result of the separation process at step S110, each pixel of the diagram 43 has recording amounts of C=0%, M=60%, Y=0%, K=80%, Lc=0% and Lm=0%, for example. The region outside the diagram 43 is a blank region where no ink is recorded, and the recording amount of CMYKLcLm is 0% in each case.

With reference to FIG. 5A, a process of identifying the first ink and the second ink regarding the diagram 43 is described. First, the target color identification unit 12b detects the edge of the diagram 43. The edge is roughly a position where color and brightness abruptly change in an image. The method of edge detection is publicly known, and therefore the description thereof is omitted here. In FIG. 5A, one of the edges of the diagram 43 is illustrated with the broken line as an edge 43E. Next, the target color identification unit 12b assumes two opposite normals perpendicular to the edge with the detected edge therebetween. In FIG. 5A, the arrows indicate normals 43A and 43B opposite to each other with the edge 43E therebetween.

Of the above-described two normals, the target color identification unit 12b sets the normal directed to the higher recording density side as high density side normal and the normal directed to the lower recording density side as low density side normal. The high density side normal is the normal directed to the inside of the diagram 43 and the low density side normal is the normal directed to the outside of the diagram 43. In the example illustrated in FIG. 5A, the normal 43A is the low density side normal, and the normal 43B is the high density side normal. The target color identification unit 12b identifies the first ink and the second ink on the basis of the recording amount of each pixel on the side to which the high density side normal is directed from the edge.

Each pixel on the side of the normal 43B from the edge 43E has a recording amount of M=60% and K=80%. In view of this, the target color identification unit 12b identifies the first ink and the second ink with reference to a recording density table 50 on the basis of this recording amount.

Figure 6:
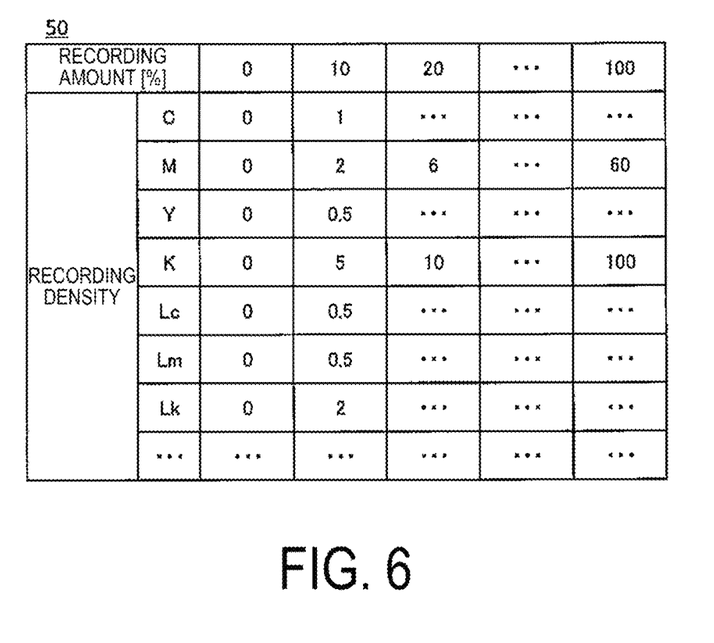
FIG. 6 is a diagram illustrating an example of a recording density table.

FIG. 6 illustrates an example of the recording density table 50. The recording density table 50 is stored in advance in the storage unit 15, and the control unit 11 can refer to the recording density table 50. The recording density table 50 defines the correspondence relationship between the recording amount [%] of ink and the recording density on the medium 30 for each color of ink. The recording density table 50 expresses the recording density on a scale of 0 to 100. In the recording density table 50, when the M ink has a recording amount=20%, a recording density=6 holds, for example. In addition, in the recording density table 50, when the K ink is a recording amount=100%, a recording density=100 holds. When the recording amount is the same, the K ink has the highest recording density among CMYKLcLmLk inks.

With reference to the recording density table 50, the target color identification unit 12b reads and compares the recording density corresponding to the recording amount=60% of the M ink, and the recording density corresponding to the recording amount=80% of the K ink, and sets the ink corresponding to the higher recording density as the first ink and the ink corresponding to the lower recording density as the second ink. The recording density corresponding to the recording amount=60% of the M ink<the recording density corresponding to the recording amount=80% of the K ink holds, and accordingly the target color identification unit 12b sets the first ink=the K ink and the second ink=the M ink for the diagram 43.

The target color identification unit 12b performs the above-described identification of the first ink and the second ink for each color overlapped object extracted at step S120. When the letter 41 illustrated in FIG. 4A is included in the recording data 40, the target color identification unit 12b identifies the first ink and the second ink also for the letter 41. Regarding the letter 41, the first ink=the K ink and the second ink=the C, M, Y inks holds. The first ink may be regarded as the strongest color or the most predominant color when the color overlapped object expressed by the recording data is recorded on the medium 30. Note that the target color identification unit 12b need only set which of the two normals 43A and 43B is the high density side normal or the low density side normal by determining the level of the recording density with reference to the recording density table 50.

At step S140, the recording data generation unit 12a performs "edge process" of the second ink for each color overlapped object. The edge process of the second ink is a process of replacing the second ink with the surrounding color of the color overlapped object at the edge part of the color overlapped object. In the case where the second ink is inks of a plurality of colors, the edge process is provided for each second ink. The first ink is not to be subjected to the edge process. The surrounding color is the color of the pixel on the side to which the low density side normal is directed from the edge, and the surrounding color of the diagram 43 is blank with a recording amount of 0% as described above. As a result of the edge process, in comparison with the region in which recording is performed with the first ink corresponding to the color overlapped object (hereinafter referred to as first region), the region in which recording is performed with the second ink corresponding to the same color overlapped object (hereinafter referred to as second region) is smaller. The first region may be regarded as the region of the color overlapped object itself.

Figure 5B:
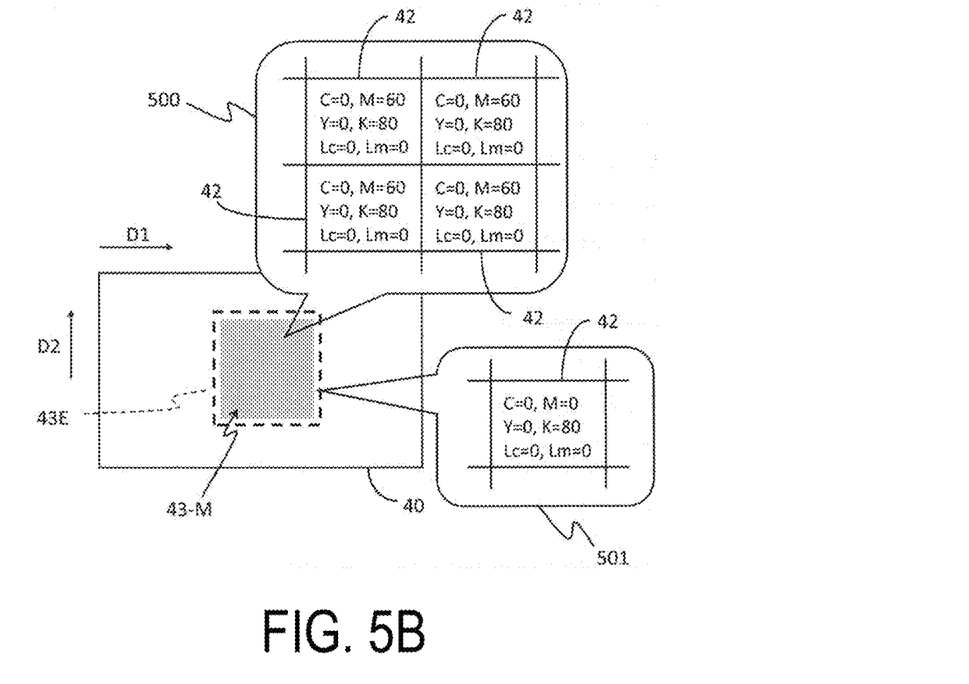
FIG. 5B is a diagram for describing a specific example of step S140.

FIG. 5B is a diagram for describing a specific example of step S140 and illustrates a part of the recording data 40. The illustration manner of FIG. 5B is substantially the same as that of FIG. 5A. The enlarged view 500 in FIG. 5B is the same as the enlarged view 500 of FIG. 5A, and illustrates a recording amount of the pixel 42 at the position that has not subjected to the edge process of step S140. On the other hand, an enlarged view 501 illustrates a recording amount of the pixel 42 at the position subjected to the edge process step S140. The pixel 42 illustrated in the enlarged view 500 and the pixel 42 illustrated in the enlarged view 501 are different from each other only in that the recording amount of the M ink is changed from 60% to 0%.

The edge 43E indicated with the broken line in FIG. 5B is the same as the edge 43E of the diagram 43 illustrated in FIG. 5A. It should be noted that FIG. 5B illustrates the whole circumference of the edge 43E corresponding to the four sides of the diagram 43. In FIG. 5B, the region illustrated in a color lighter than the diagram 43 of FIG. 5A is the region excluding the edge part of the diagram 43 and is a region 43-M recorded with the M ink corresponding to the diagram 43 through step S140. That is, the region 43-M represents the second region. In addition, the region surrounded with the edge 43E in FIG. 5B is the diagram 43 itself, and as such represents the first region. The region surrounded with the edge 43E is naturally recorded also with the K ink as illustrated in the enlarged views 500 and 501, while, in FIG. 5B, the part of the K ink is intentionally hidden for the purpose of clearly illustrating the state where the region in which recording is performed with the M ink is reduced through the edge process.

For the edge part of the pixels making up the diagram 43, i.e., the edge pixels corresponding to the edge 43E and a predetermined number of pixels continuously connected inside the diagram 43, the recording data generation unit 12a replaces the recording amount of the M ink as the second ink=60% with the recording amount of the surrounding color=0%. As a result, of the K ink and M ink for recording the diagram 43, the second region 43-M recorded with the M ink is smaller than the first region in which recording is performed with the K ink and is located inside the first region in which recording is performed with the K ink in the recording data 40 as illustrated in FIG. 5B.

At step S150, a recording process based on the recording data having been subjected to the edge process at step S140 is performed. In this case, the recording data generation unit 12a converts each gradation value of CMYKLcLm provided for each pixel in the recording data having been subjected to step S140, into a value representing the dot discharging or dot non-discharging of each CMYKLcLm ink through a halftone process using a dither method or an error diffusion method, for example. The dot discharging and dot non-discharging are also referred to as dot-on and dot-off, respectively.

Then, the record control unit 12c controls the conveyance unit 17 to convey the medium 30, and controls the recording unit 18 to perform recording on the medium 30 on the basis of the recording data after the halftone process. As a result, the recording head 19 records the image represented by the recording data on the medium 30 by discharging dots from each nozzle 21 of each nozzle row in accordance with the dot-on and dot-off defined by the recording data for each pixel and for each ink color. The above-described steps S140 and S150 correspond to "recording step" in which recording is performed on the medium 30 in accordance with the recording data for recording a plurality of types of recording materials in the same region of the medium 30 such that the second region in which recording is performed with the second ink corresponding to the same region is smaller than the first region in which recording is performed with the first ink corresponding to the same region. In this manner, the flowchart of FIG. 3 is completed.

3. Conclusion

As described above, the recording device 10 according to this embodiment includes the recording unit 18 configured to record a plurality of types of recording materials on the medium 30, and the control unit 11 configured to control recording with the recording unit 18. When performing recording on the medium 30 in accordance with the recording data for recording a plurality of types of recording materials in the same region of the medium 30, the control unit 11 identifies the first recording material with a relatively high recording density in the same region and the second recording material with a lower recording density in the same region than that of the first recording material on the basis of recording data, and performs the recording such that the second region in which recording is performed with the second recording material corresponding to the same region is smaller than the first region in which recording is performed with the first recording material corresponding to the same region.

With this configuration, when recording a plurality of types of recording materials in the same region of the medium 30, i.e., when recording the color overlapped object, the recording is performed such that the second region in which recording is performed with the second recording material is smaller than the first region in which recording is performed with the first recording material. Thus, even if the position where the first recording material is recorded on the medium 30 and the position where the second recording material is recorded on the medium 30 are shifted from each other during the recording with the recording unit 18, protrusion of the second region to the outside of the first region can be avoided, and the appearance of the edge of the recorded result can be favorably maintained. That is, blurring of the edge can be avoided as described with FIG. 4B.

With this configuration, regarding the color of the recorded result, the size of the recording region of the second recording material that is less predominant, i.e., lower in degree of influence, than the first recording material is reduced. Thus, change of the color of the recorded result from the color originally intended by the recording data can be suppressed as much as possible.

In addition, according to this embodiment, the recording data is data defining the recording amount of each of the recording materials of a plurality of colors used by the recording unit 18 for each pixel. The recording materials of a plurality of colors are ink or toner of a plurality of colors. With this configuration, the control unit 11 can identify the first recording material and the second recording material by acquiring the recording density from the recording amount of each color defined by the recording data.

In addition to devices and systems, this embodiment discloses inventions of various categories such as a method implemented by a device and a system, and the program 12 for causing a processor to execute a method.

For example, a recording method of performing recording by controlling the recording unit 18 configured to record a plurality of types of recording materials on the medium 30 includes an identification step of identifying the first recording material with a relatively high recording density in the same region and the second recording material with a lower recording density in the same region than that of the first recording material on the basis of recording data when the recording unit 18 performs recording on the medium 30 in accordance with the recording data for recording a plurality of types of recording materials in the same region of the medium 30, and a recording step of performing the recording such that the second region in which recording is performed with the second recording material corresponding to the same region is smaller than the first region in which recording is performed with the first recording material corresponding to the same region.

4. Modification

Modifications included in this embodiment are described below. In modifications, description of the same components as those of the above-described embodiment is omitted. In addition, combinations of modifications are included in this embodiment.

First Modification

Edge degradation, i.e., blurring of edge due to positional displacement of different recording materials on the medium 30 is easily noticeable in letters, ruled line, geometric diagrams and patterns. On the other hand, in nature paintings and portraits, where a plurality of colors of various densities are often disposed in a complicated manner and shifted from each other, the edge degradation due to the positional displacement between different recording materials is less noticeable than letters and the like. In view of this, in the case where the attribute of the image represented by the recording data is a first attribute corresponding to letters and a ruled line, the control unit 11 may increase the difference between the first region and the second region corresponding to the same region in comparison with the case where the attribute of the image represented by the recording data is a second attribute that is not the first attribute.

Figure 7:
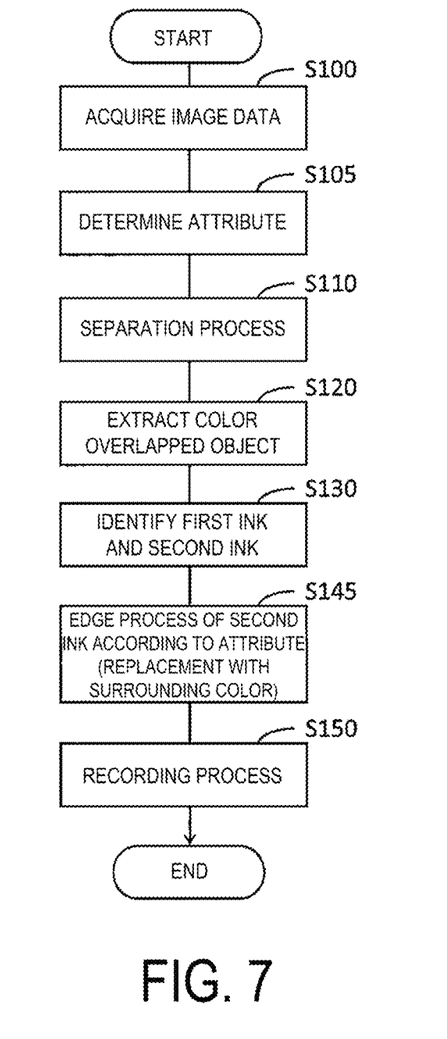
FIG. 7 is a flowchart of a record control process according to a first modification.

FIG. 7 is a flowchart of a record control process according to a first modification. Compared to FIG. 3, FIG. 7 differs in steps S105 and S145. After step S100, the control unit 11 determines whether the attribute of the image represented by the image data acquired at step S100 corresponds to the first attribute corresponding to letters and a ruled line, or an attribute other than the first attribute, i.e., the second attribute at step S105.

The method of determining the attribute of the image is not limited. The control unit 11 determines whether the attribute is the first attribute or the second attribute by analyzing the content of the image, for example. Alternatively, the control unit 11 may determine whether the attribute is the first attribute or the second attribute in accordance with the information related to the attribute described in advance in the header of the image data and the like. Alternatively, the control unit 11 may receive, as the attribute of the image, the attribute selected by the user through the operation reception unit 14. The timing of this attribute determination is not limited to the timing between step S100 and step S110 as long as it is earlier than execution of step S145.

At step S145, the recording data generation unit 12a performs the edge process of the second ink for each color overlapped object. The edge process at step S145 is different from step S140 in that it is an edge process corresponding to the attribute of the image. With reference to FIG. 5B again, the size of the region surrounded by the edge 43E as described above is the size of the diagram 43 and the size of the first region. On the other hand, the size of the region 43-M obtained by excluding the edge part from first region is the size of the second region corresponding to the diagram 43.

There are various methods for defining the difference between the first region and the second region. For example, when the ratio of the size of the second region to the size of the first region of the color overlapped object is referred to as "second region ratio", it can be said that the smaller the second region ratio, the greater the difference between the first region and the second region. In view of this, the control unit 11 preliminarily defines the second region ratio=α applied to the first attribute and the second region ratio=β applied to the second attribute. The relationship of $\alpha<\beta\leq 1$ holds.

Then, when it is determined that the attribute is the first attribute in the above-described attribute determination, the recording data generation unit 12a defines the edge part composed of the edge pixel and pixels continuously connected inside the edge pixel for the color overlapped object such that the second region ratio of the color overlapped object is a, and performs the edge process of the second ink on each pixel of the edge part. On the other hand, when it is determined that the attribute is the second attribute in the attribute determination, the recording data generation unit 12a defines the edge part for the color overlapped object such that the second region ratio of the overlap object is R, and performs the edge process of the second ink on each pixel of the edge part.

According to the first modification described above, when the attribute of the image is the first attribute, the edge part to be subjected to the edge process of the second ink in the color overlapped object is set to a larger size than when the attribute is the second attribute. Thus, during the recording of an image where edge degradation due to the positional displacement between different recording materials is easily noticeable, the occurrence of such edge degradation can be appropriately suppressed. In addition, according to the first modification, during the recording of an image where edge degradation due to the positional displacement between different recording materials is less noticeable, the edge part to be subjected to the edge process of the second ink is set to a small size, and thus change of the color of the recorded result from the color originally intended by the recording data can be suppressed as much as possible.

As described above, $\alpha<\beta\leq 1$ holds, and therefore β=1 may hold. Thus, when the attribute of the image is the second attribute, the recording data generation unit 12a may omit the edge part to be subjected to the edge process of the second ink at step S145, i.e., may not perform the edge process of the second ink. Alternatively, when it is determined that the attribute of the image is the second attribute at step S105, steps S120, S130, and S145 may not be performed in the first place.

Second Example

The displacement is less noticeable in the relationship of the recording materials of the same color system even when there is positional displacement between different recording materials in the recorded result. In view of this, the control unit 11 may set the difference between the first region and the second region corresponding to the same region to a smaller value for the second recording material of the same color system as the first recording material than for the second recording material that is not the same color system as the first recording material.

The same color system is the relationship of the colors with the same or similar hues among the recording materials used by the recording unit 18. For example, C ink and Lc ink are the same color system. In addition, M ink and Lm ink are the same color system. In addition, achromatic color inks are also the same color system. For example, K ink, Lk ink, and grey ink are the same color system. In addition, in a product in which the recording unit 18 uses K inks of two or more types, the K inks of the two or more types are also inks of the same color system.

Figure 8:
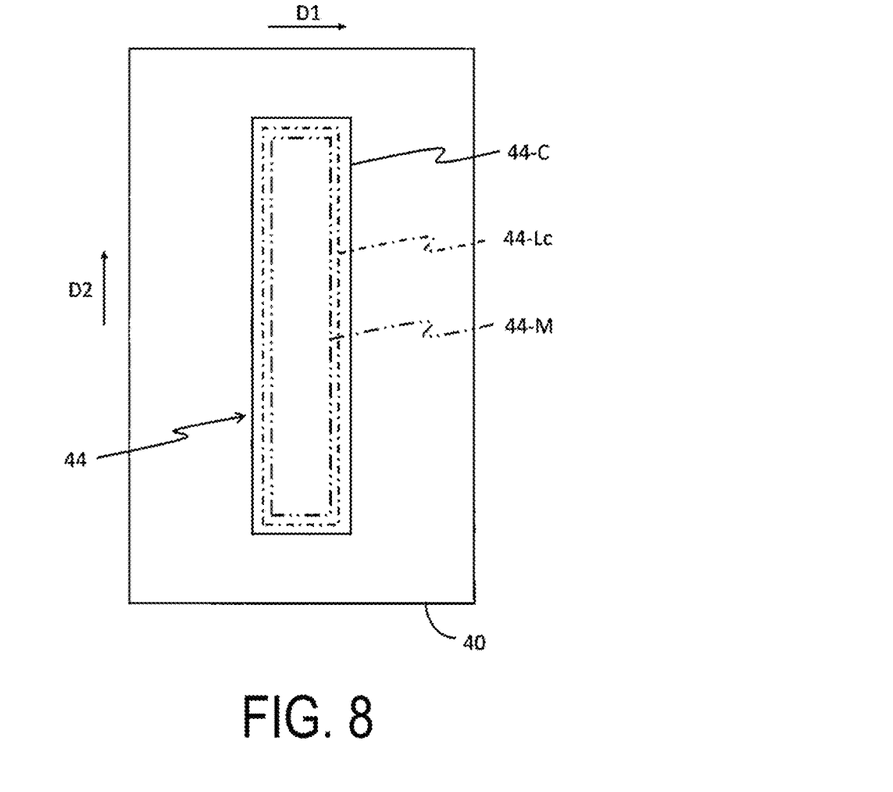
FIG. 8 is a diagram for describing a second modification.

With reference to FIG. 8, a second modification is elaborated below. In FIG. 8, the solid line indicates, in an enlarged manner, a part of the recording data 40 after a separation process, and a part of a ruled line 44 with a predetermined thickness included in the recording data 40. The ruled line 44 is one color overlapped object. While the color expression of the ruled line 44 is omitted in FIG. 8, it is assumed that the recording amount of each pixel making up the ruled line 44 is C=70%, M=20%, Y=0%, K=0%, Lc=40%, and Lm=0%. With this recording amount, the first ink=the C ink and the second ink=the M ink and Lc ink hold for the ruled line 44. That is, the M ink of the second ink is not the same color system as the first ink, while the Lc ink is the same color system as the first ink. In this example case, at step S140 or at step S145, the recording data generation unit 12a performs the edge process of each second ink for the ruled line 44 such that the edge portion to be replaced with the surrounding color is narrower for the Lc ink, which is one of the second ink than for the M ink, which is another one of the second ink.

In FIG. 8, a region 44-C indicated with the reference numeral 44-C and surrounded by the solid line is the region of the ruled line 44 itself, and corresponds to the first region in which recording is performed with the C ink corresponding to the ruled line 44. In addition, a region 44-Lc surrounded with the single dotted line inside the first region 44-C is the second region in which recording is performed with the Lc ink corresponding to the ruled line 44, and a region 44-M surrounded with the two-dotted line inside the region 44-Lc is the second region in which recording is performed with the M ink corresponding to the ruled line 44. The difference between the first region 44-C and the second region 44-Lc is smaller than the difference between the first region 44-C and the second region 44-M.

That is, the recording data generation unit 12a performs the edge process on the Lc ink of the ruled line 44 by regarding, as the edge part, the pixels outside the second region 44-Lc of the pixels making up the first region 44-C, and performs the edge process on the M ink of the ruled line 44 by regarding, as the edge part, the pixels outside the second region 44-M of the pixels making up the first region 44-C. According to the second modification, when recording the color overlapped object, the second region is set to a larger size for the second recording material with the same color system that is almost not noticeable even when the recording position on the medium 30 is shifted from the first recording material than for the second recording material that is not the same color system as the first recording material. Thus, change of the color of the recorded result from the color originally intended by the recording data can be suppressed as much as possible while appropriately suppressing the edge degradation due to the positional displacement between different recording materials.

Note that the process of setting a smaller difference between the first region and the second region for the second recording material with the same color system as the first recording material than for the second recording material that is not the same color system as the first recording material may include setting the difference between the first region and the second region to 0. That is, in the second modification, the edge process may not be performed for the second recording material with the same color system as the first recording material.

Other Explanation

When recording a plurality of types of recording materials in the same region of the medium 30, the first recording material may not be limited to a recording material with the largest recording density corresponding to the recording data among the plurality of types of recording materials. The control unit 11 may handle the recording material with the largest recording density corresponding to the recording data and the recording material with the second largest recording density corresponding to the recording data among the plurality of types of recording materials as the first recording material, and the recording material with the third or lower recording density corresponding to the recording data as the second recording material, for example.

The surrounding color of the color overlapped object is not limited blank where a recording amount of the recording material is 0. For example, in recording data, the region around a certain color overlapped object may be a region with a lower recording density than that of the color overlapped object and with a color different from that of the color overlapped object. Even when the surrounding color is a color that is not blank, the control unit 11 need only replace the edge part with the recording amount of the surrounding color for the second recording material in the edge process of the second recording material as described above. Alternatively, the control unit 11 may replace the edge part with the recording amount 0 for the second recording material in the edge process of the second recording material regardless of whether the surrounding color is blank.

What is claimed is:

1. A recording device comprising:
a recording unit configured to record a plurality of types of recording materials on a medium; and
a control unit configured to control recording by the recording unit, wherein
when performing recording on the medium in accordance with recording data for recording a plurality of types of recording materials in a same region on the medium,
the control unit identifies a first recording material with a relatively high recording density in the same region, and a second recording material with a lower recording density in the same region than that of the first recording material, based on recording data, the control unit performs recording such that a second region in which recording is performed with the second recording material corresponding to the same region is smaller than a first region in which recording is performed with the first recording material corresponding to the same region, and when an attribute of an image represented by the recording data is a first attribute corresponding to a letter or a ruled line, the control unit increases a difference between the first region and the second region corresponding to the same region than when the attribute of the image represented by the recording data is a second attribute that is not the first attribute.

2. The recording device according to claim 1, wherein the recording data is data in which a recording amount of each of recording materials of a plurality of colors used by the recording unit is defined for each of pixels.

3. A recording device according to claim 1, comprising:
a recording unit configured to record a plurality of types of recording materials on a medium; and
a control unit configured to control recording by the recording unit, wherein when performing recording on the medium in accordance with recording data for recording a plurality of types of recording materials in a same region on the medium, the control unit identifies a first recording material with a relatively high recording density in the same region, and a second recording material with a lower recording density in the same region than that of the first recording material, based on recording data, the control unit performs recording such that a second region in which recording is performed with the second recording material corresponding to the same region is smaller than a first region in which recording is performed with the first recording material corresponding to the same region, and the control unit reduces a difference between the first region and the second region corresponding to the same region for a recording material of the second recording material that is the same color system as the first recording material than for a recording material of the second recording material that is not the same color system as the first recording material.

4. The recording device according to claim 3, wherein the recording data is data in which a recording amount of each of recording materials of a plurality of colors used by the recording unit is defined for each of pixels.

5. A recording method of performing recording by controlling a recording unit configured to perform recording of a plurality of types of recording materials on a medium, the recording method comprising: when the recording unit performs recording on the medium in accordance with recording data for recording a plurality of types of recording materials in a same region on the medium, an identification step of identifying a first recording material with a relatively high recording density in the same region, and a second recording material with a lower recording density in the same region than that of the first recording material, based on recording data; and a recording step of performing recording such that a second region in which recording is performed with the second recording material corresponding to the same region is smaller than a first region in which recording is performed with the first recording material corresponding to the same region, wherein when an attribute of an image represented by the recording data is a first attribute corresponding to a letter or a ruled line, a difference between the first region and the second region corresponding to the same region is increased than when the attribute of the image represented by the recording data is a second attribute that is not the first attribute.

6. A recording method of performing recording by controlling a recording unit configured to perform recording of a plurality of types of recording materials on a medium, the recording method comprising: when the recording unit performs recording on the medium in accordance with recording data for recording a plurality of types of recording materials in a same region on the medium, an identification step of identifying a first recording material with a relatively high recording density in the same region, and a second recording material with a lower recording density in the same region than that of the first recording material, based on recording data; and a recording step of performing recording such that a second region in which recording is performed with the second recording material corresponding to the same region is smaller than a first region in which recording is performed with the first recording material corresponding to the same region, wherein a difference between the first region and the second region corresponding to the same region for a recording material of the second recording material that is the same color system as the first recording material is reduced than for a recording material of the second recording material that is not the same color system as the first recording material.

* * * * *